US007871186B2

(12) United States Patent
Minor

(10) Patent No.: US 7,871,186 B2
(45) Date of Patent: Jan. 18, 2011

(54) POLE VIBRATION DAMPING APPARATUS

(75) Inventor: Ray Carl Minor, Abingdon, VA (US)

(73) Assignee: Kearney-National, Inc., New York, NY (US)

( * ) Notice: Subject to any disclaimer, the term of this patent is extended or adjusted under 35 U.S.C. 154(b) by 739 days.

(21) Appl. No.: 11/730,532

(22) Filed: Apr. 2, 2007

(65) Prior Publication Data

US 2008/0239733 A1 Oct. 2, 2008

(51) Int. Cl.
*B60Q 1/00* (2006.01)

(52) U.S. Cl. ...................................... 362/369; 362/390

(58) Field of Classification Search ................. 362/369, 362/390; 188/378–381
See application file for complete search history.

(56) References Cited

U.S. PATENT DOCUMENTS

| | | | | |
|---|---|---|---|---|
| 5,896,961 | A * | 4/1999 | Aida et al. | 188/378 |
| 7,232,017 | B2 | 6/2007 | Minor | |
| 2005/0217955 | A1 * | 10/2005 | Minor | 188/378 |

* cited by examiner

*Primary Examiner*—Ricky L Mack
*Assistant Examiner*—Mark Tsidulko
(74) *Attorney, Agent, or Firm*—Buchanan Ingersoll & Rooney PC

(57) ABSTRACT

A highway lighting apparatus includes a lighting fixture, and a vibration damper. The vibration damper includes a housing having a ball chamber, the chamber being of square shape. One or two vibration damping balls are mounted in the chamber for independent free rolling movement therein. If two balls are used, the ball diameter is shorter than one-half of each of the four chamber sides. If the damper is used on a pole having a side-mounted light fixture, the housing would include a downwardly open socket receiving the top end of the pole, with a center axis of the pole coinciding with respective center axes of the chamber and the socket. In the case where the damper is used on a pole having a top-mounted light fixture, the damper would be mounted below the light fixture on a side of the pole.

12 Claims, 4 Drawing Sheets

POLE VIBRATION DAMPING APPARATUS

BACKGROUND

The present invention relates to a vibration damping apparatus for use on light stands.

Light poles and similar structures are subjected to wind induced Vibrations which can result in costly and hazardous failures of such structures. Many parameters, including pole geometry and materials, wind speed, wind gust frequency and velocity, are involved in effecting pole vibration. The present inventor has devised a vibration damping apparatus for reducing first mode natural frequency vibrations, which apparatus is described in Published U.S. Application No. 2005/0217955, filed Apr. 1, 2004, now U.S. Pat. No. 7,232,017, granted Jun. 19, 2007. The entire disclosure of that document is incorporated by reference herein.

While such a damper has performed effectively, it would be desirable to provide a simpler and more economical damper.

BRIEF DESCRIPTION OF THE DRAWINGS

Objects and advantages of the invention will become apparent from the following detailed description of a preferred embodiment thereof in connection with the accompanying drawings.

DETAILED DESCRIPTION OF PREFERRED EMBODIMENTS

Figure 1:
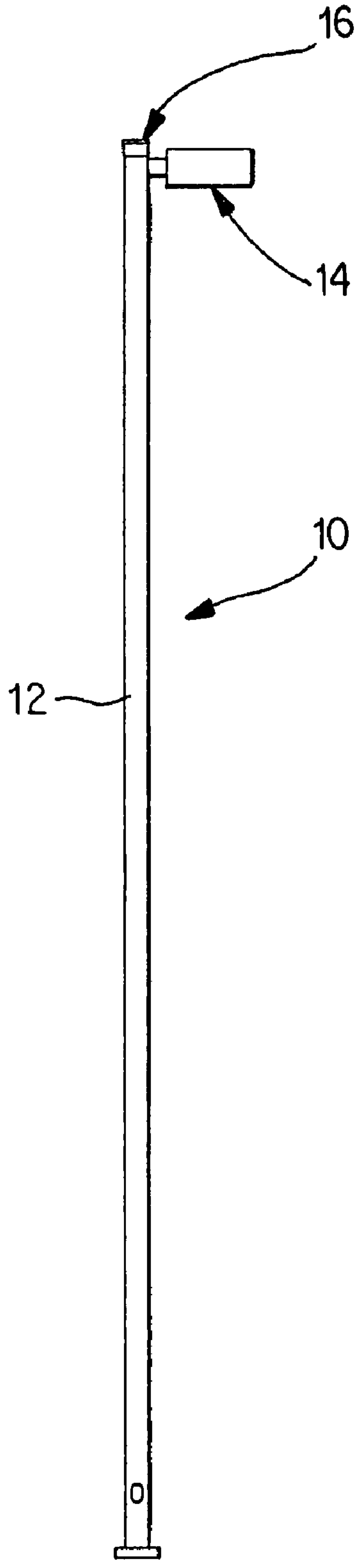
FIG. 1 is a side elevation view of a square pole having a side-mounted light standard adjacent its top end, and on which a vibration damping apparatus is mounted.
Figure 2:
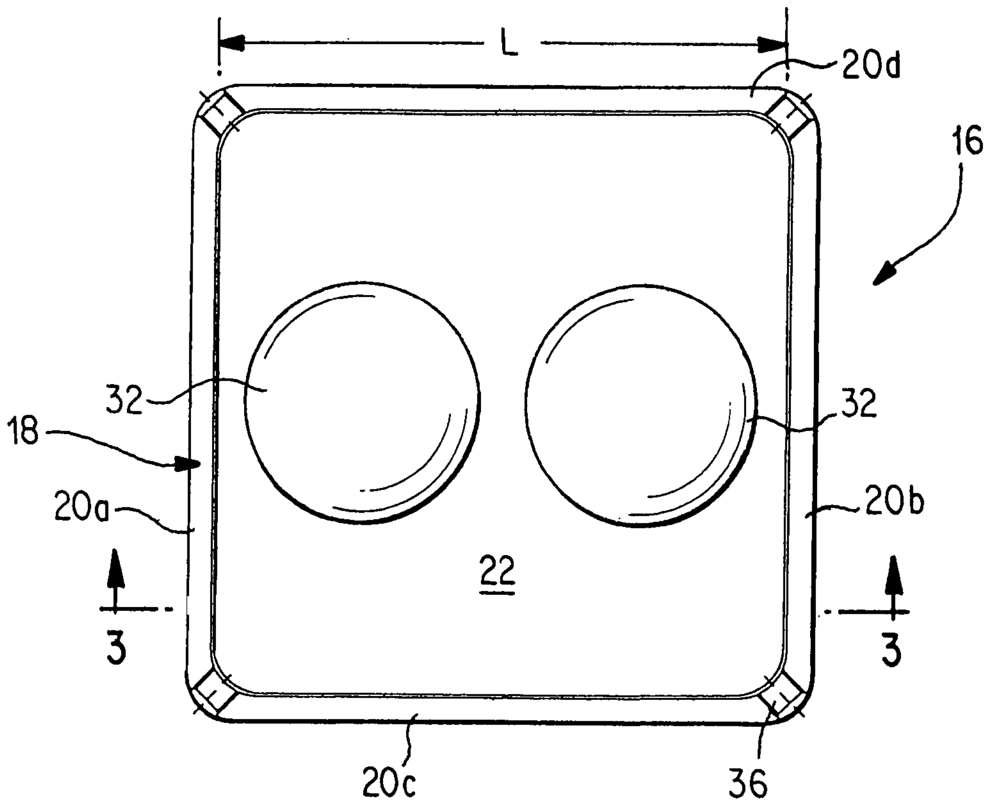
FIG. 2 is a top plan view of the vibration damping apparatus of FIG. 1 with a top cover thereof removed.
Figure 3:
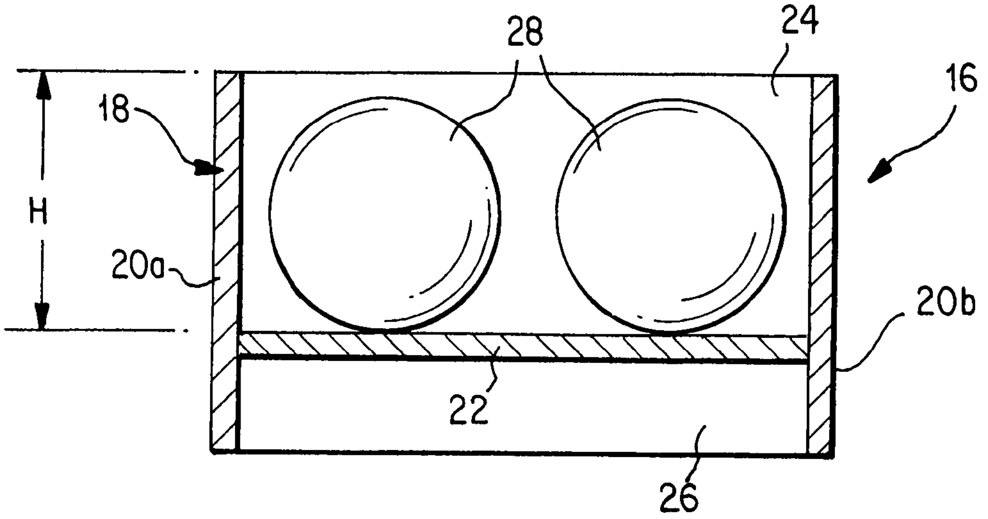
FIG. 3 is a sectional view taken along line 3-3 in FIG. 2.

Shown in FIG. 1 is a highway lighting structure 10 comprising a square pole 12 adapted to be anchored at its lower end and having a side-mounted light fixture 14 adjacent its top end. Also mounted on the pole, at the very top end, above the place where the fixture 14 connects to the pole, is a first preferred vibration damping apparatus 16 described in detail below.

The vibration damping apparatus 16, which can replace the usual cover plate attached to the top of the pole, comprises a housing 18 defined by four upright side walls 20*a*-20*d* and a horizontal floor 22 which together define a ball chamber 24. The ball chamber has a center axis coinciding with a center axis A of the pole. There is only one such chamber in the housing, i.e., a chamber whose center axis coincides with the pole's center axis A. The chamber 24 is of square shape when viewed from above (see FIG. 1). The side walls extend downwardly past the floor to define a square socket 26 adapted to receive the top end of the pole 12 such that the center axis of the socket coincides with the pole's center axis. Alternatively, the socket could be cylindrical to receive the top end of a circular pole.

The chamber is closed at its top by a cover 30. The cover 30 is secured in place by set screws 29 (only one shown) that extend through side walls of the cover and engage the side walls 20*c* and 20*d* of the housing 18.

It will be appreciated that in lieu of employing a removable top cover, other means could be provided for enabling balls to be installed in the chamber 24. For example, the chamber could have a fixed top, and one or more of the sides could have an opening therein (not shown) to enable the balls to be inserted into the chamber. That side opening(s) could be provided with a removable cover.

Disposed in the chamber 24 is at least one, but no more than two, vibration damping balls 28. Those two vibration damping balls 28 are of equal size and mass and are adapted to roll independently and freely within the chamber. The balls can be of any suitable size and composition as long as they are freely movable within the chamber and are of enough mass to effectively dampen vibration.

For example, each ball can be formed of lead with a one-eighth inch plastic coating. In the case of a square chamber having, on each of its four sides, a length L of about seven inches and a height H of about three inches, each ball could be a two-pound lead ball having a one-eighth inch plastic coating. The diameter of each ball must be less than one-half of the length L and less than the height H, e.g., in the above example, the ball diameter could be about 2¼ inches, to enable the balls to be freely movable within the chamber and able to simultaneously move the entire length or width of the chamber.

If only one ball is to be used, it could be of the same size as one of the balls 28, or somewhat larger, and the ball diameter could be greater than one-half of the sidewall length L.

Figure 4:
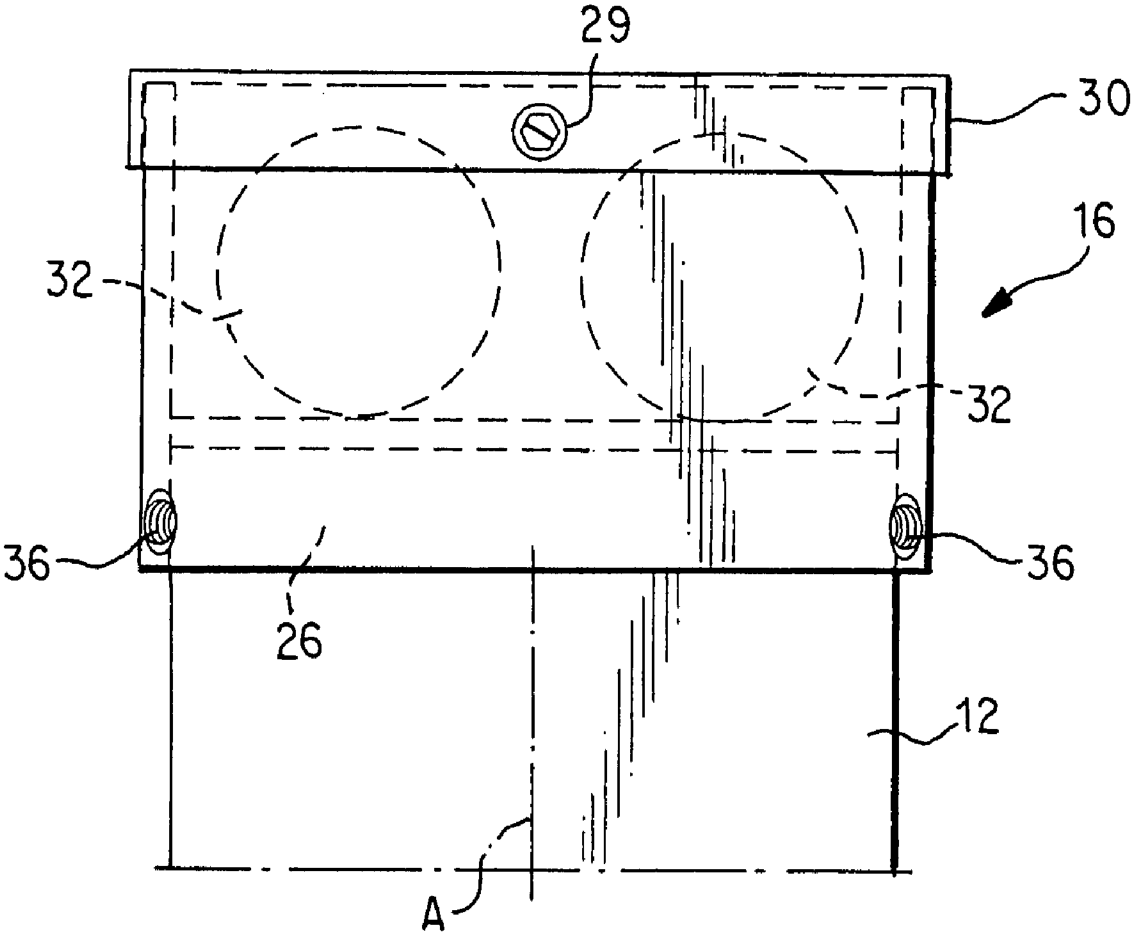
FIG. 4 is a side elevation view of the vibration damping apparatus similar to FIG. 2, with the cover installed, and mounted at the top of a square pole.

Shown in FIG. 4 is the top of the pole 12 received in the downward mount defined by the socket 26. The socket is secured on the pole by screws (not shown) that are inserted through threaded holes formed in respective corners of the socket.

When the pole is subjected to wind induced vibrations, the top of the pole moves laterally, but the balls tend to remain at rest (Newton's first law of motion) which is permitted by the ability of the balls to roll relative to the fixture. The balls are thus shifted relative to the fixture in a direction opposing the pole motion (i.e., away from a leading side of the chamber with respect to the direction of pole motion) and may strike the trailing side of the chamber in order to dampen that motion. Since the diameter of each ball is less than one-half of the dimension L of each side of the chamber 24, the balls are capable, if necessary, of moving along the entire length of the chamber to provide an effective damping action. That is, the ability of each ball to move the entire length of the chamber enables the ball to achieve greater speed and momentum when striking the chamber's trialing side and thus achieve greater damping than would be the case if each ball were confined to its own respective small chamber, e.g., by the presence of divider walls.

Although the vibration damper 16 has been disclosed in connection with a square pole, it will be appreciated that it could be used on a round, tapered pole as well, by a suitable configuring of the shape of the socket 26.

Figure 5:
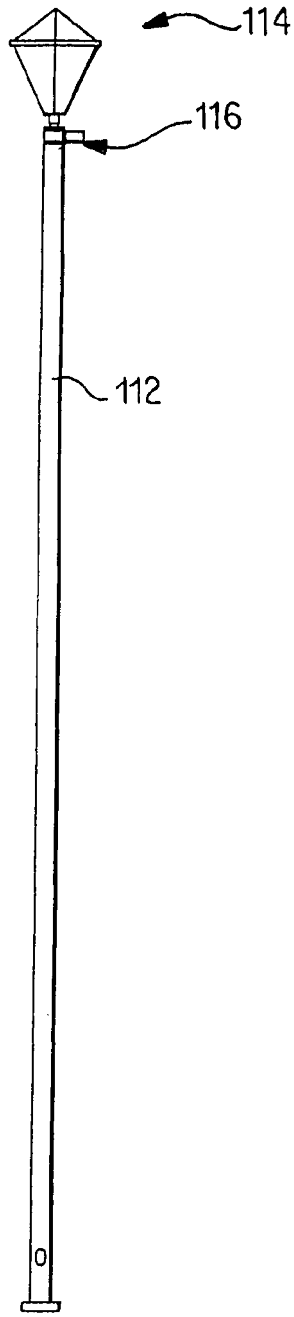
FIG. 5 is a view similar to FIG. 1 of a square pole with a top-mounted light fixture and a vibration damping device mounted on a side of the pole.
Figure 7:
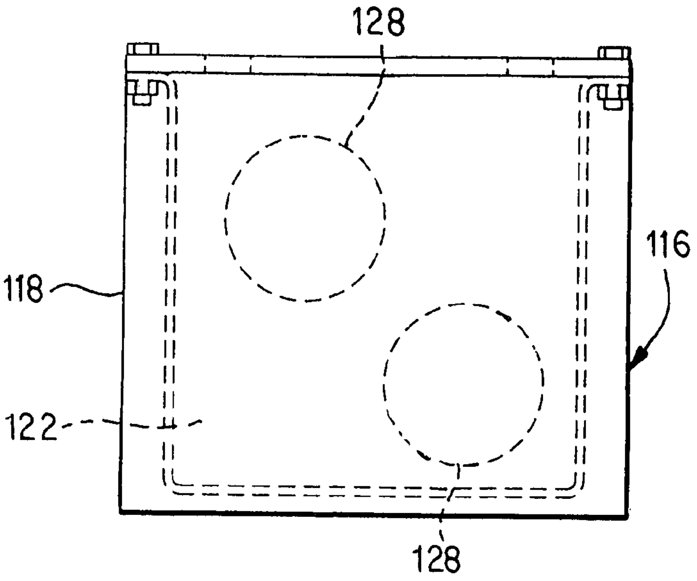
FIG. 7 is a plan view of the damping device of FIGS. 5 and 6.
Figure 6:
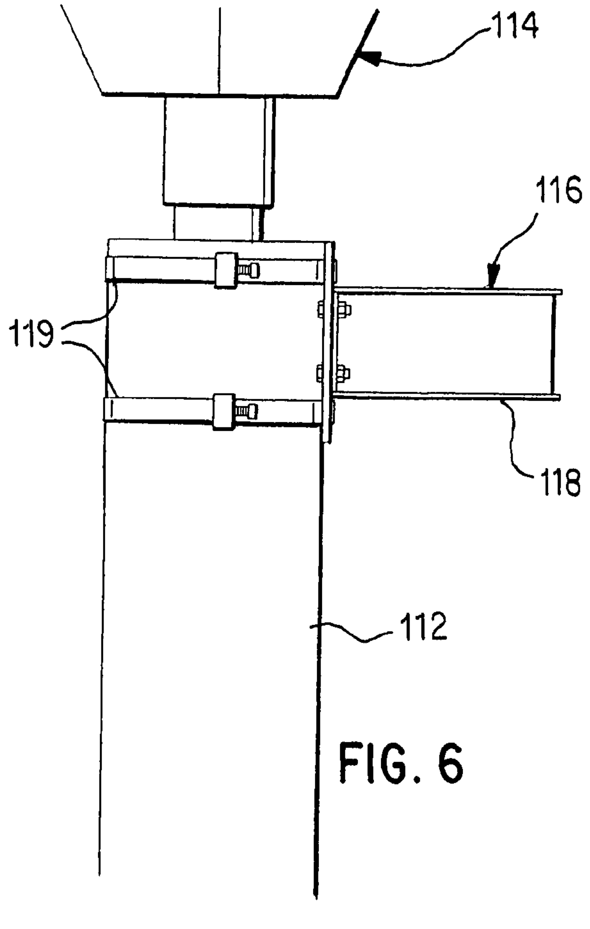
FIG. 6 is an enlarged fragmentary view of FIG. 5.

A damper similar to that of FIGS. 1-4 is also applicable to a pole 112 having a top-mounted light fixture 114, by making some relatively minor changes, as shown in FIGS. 5-7. Thus, the damper 116 would be mounted to a side of the pole below the light fixture by bolting one side of the damper's housing 118 to straps 119 which are attached to the pole, as shown in FIG. 6. Otherwise, the damper is similar to that of FIGS. 1-4 in that it possesses a square ball chamber 124 containing at least one, but no more than two, balls 128, similar to those described earlier. The balls are disposed for free rolling movement along a horizontal floor 122 of the chamber, the ball diameter being less than one-half of the length of each chamber side so that the balls can move the entire length of the chamber side for achieving maximum momentum.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A vibration damping apparatus comprising:

a housing comprising:

an enclosed ball chamber, there being only a single ball chamber, the chamber being of square shape when viewed from above, the ball chamber having four sides and a horizontal floor and being closed at its top, and a mount for receiving a top end of a pole; and at least one and no more than two vibration damping balls disposed in the ball chamber and freely movable therein in any direction for the full length of the chamber;

wherein there are exactly two vibration damping balls, each having a diameter less than one-half the length of each side of the square chamber;

wherein the mount comprises a downwardly open socket having a center axis substantially coinciding with a center axis of the chamber.

2. The apparatus according to claim 1, further including a removable cover for closing the top of the chamber.

3. The apparatus according to claim 1, wherein the socket is a square socket.

4. The apparatus according to claim 1, wherein a light fixture is mounted on the top end of the pole.

5. The apparatus according to claim 4, wherein the light fixture and the damper have a common center axis.

6. A highway lighting apparatus, comprising a pole, a vibration damping apparatus mounted on the pole, and a light fixture mounted on the pole, the damping apparatus comprising:

a housing attached to the pole adjacent the light fixture and comprising:

an enclosed ball chamber, there being only one such chamber in the housing, the ball chamber being of square shape when viewed from above, the ball chamber having four sides and a horizontal floor, at least one and no more than two vibration damping balls disposed in the chamber and independently freely movable therein in any direction for a full length of the square chamber, wherein the total number of vibration damping balls carried by the pole does not exceed two, and such total number of balls being situated in the chamber;

wherein the damper is mounted on a top end of the pole and the light fixture is mounted to the pole below the damper and projects laterally from the pole, with the pole and the chamber having a common center axis.

7. The apparatus according to claim 6, wherein there are exactly two vibration damping balls, each having a diameter less than one-half the length of each side of the chamber.

8. The apparatus according to claim 6, further including a removable cover for closing the top of the chamber.

9. The apparatus according to claim 6, wherein the housing includes a mount which comprises a downwardly open socket having a center axis substantially coinciding with a center axis of the pole.

10. The apparatus according to claim 9 wherein the socket is a circular socket.

11. The apparatus according to claim 9, wherein the socket is square.

12. A vibration damping apparatus comprising:

a housing comprising:

an enclosed ball chamber, there being only a single ball chamber, the chamber being of square shape when viewed from above, the ball chamber having four sides and a horizontal floor and being closed at its top, and a mount for attaching the housing adjacent a top end of a pole and comprising a downwardly open socket having a center axis substantially coinciding with a center axis of the chamber; and at least one and no more than two vibration damping balls disposed in the ball chamber and freely movable therein in any direction for the full length of the chamber.

* * * * *